(12) United States Patent
Sivaramakrishnan et al.

(10) Patent No.: US 9,147,195 B2
(45) Date of Patent: Sep. 29, 2015

(54) DATA CUSTODIAN AND CURATION SYSTEM

(75) Inventors: Hari Sivaramakrishnan, Bellevue, WA (US); Roy Dsouza, Bellevue, WA (US); Lev Novik, Bellevue, WA (US); Nino Bice, Seattle, WA (US); David Robinson, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 155 days.

(21) Appl. No.: 13/159,658

(22) Filed: Jun. 14, 2011

(65) Prior Publication Data

US 2012/0323750 A1    Dec. 20, 2012

(51) Int. Cl.
| | |
|---|---|
| H04L 29/06 | (2006.01) |
| G06Q 30/02 | (2012.01) |
| G06F 21/10 | (2013.01) |
| H04L 9/14 | (2006.01) |

(52) U.S. Cl.
CPC ............ *G06Q 30/0201* (2013.01); *G06F 21/10* (2013.01); *H04L 9/14* (2013.01); *G06Q 2220/12* (2013.01); *H04L 2209/56* (2013.01)

(58) Field of Classification Search
CPC ....... G06F 21/10; H04L 9/14; G06Q 30/0201
USPC .............................. 713/189, 193; 726/27, 28
See application file for complete search history.

(56) References Cited

U.S. PATENT DOCUMENTS

| | | | |
|---|---|---|---|
| 5,615,264 A | 3/1997 | Kazmierczak et al. | |
| 7,124,101 B1 | 10/2006 | Mikurak | |
| 7,571,069 B1 | 8/2009 | Farkas et al. | |
| 7,571,191 B2 | 8/2009 | Dill et al. | |
| 7,594,109 B2 | 9/2009 | Minne | |
| 7,647,349 B2 | 1/2010 | Hubert et al. | |
| 7,849,016 B2 | 12/2010 | So | |
| 2003/0135464 A1* | 7/2003 | Mourad et al. ................. | 705/50 |
| 2004/0148278 A1 | 7/2004 | Milo et al. | |

(Continued)

FOREIGN PATENT DOCUMENTS

WO    2011051400 A1    5/2011

OTHER PUBLICATIONS

"Securing Data at Rest: Developing a Database Encryption Strategy", Retrieved at <<http://www.rsa.com/products/bsafe/whitepapers/DDES_WP_0702.pdf>>, Retrieved Date: Apr. 7, 2011, pp. 15.

(Continued)

*Primary Examiner* — Justin T Darrow
(74) *Attorney, Agent, or Firm* — Timothy Churna; Kate Drakos; Micky Minhas (57) ABSTRACT

A data custodian and curation system may store data from a data supplier in encrypted form and may allow users to consume the data when the consumers obtain access to the data through an agreement. The curation system may manage access to the data, even allowing a consumer to use the data as if it were their own, but may track each usage of the data to implement a payment scheme or various usage restrictions. The curation system may encrypt downstream uses of the data and operate as a digital rights management system for the data. The custodian and curation system may operate as a cloud service that may contain encrypted data from many data providers but where the data providers may individually control access to their data in a managed system at any granular level.

30 Claims, 4 Drawing Sheets

(56) References Cited

U.S. PATENT DOCUMENTS

| | | | |
|---|---|---|---|
| 2006/0129599 | A1 | 6/2006 | Hammerich |
| 2007/0043667 | A1* | 2/2007 | Qawami et al. ............... 705/50 |
| 2007/0294178 | A1 | 12/2007 | Pinder et al. |
| 2008/0082448 | A1 | 4/2008 | Meijer et al. |
| 2008/0104542 | A1 | 5/2008 | Cohen et al. |
| 2008/0235288 | A1 | 9/2008 | Ben Harush |
| 2010/0064354 | A1* | 3/2010 | Irvine ............................ 726/5 |
| 2010/0250533 | A1 | 9/2010 | Agro et al. |
| 2010/0293048 | A1 | 11/2010 | Singolda et al. |
| 2011/0029520 | A1 | 2/2011 | Leary et al. |

OTHER PUBLICATIONS

Damiani, et al., "Metadata Management in Outsourced Encrypted Databases", Retrieved at <<http://spdp.dti.unimi.it/papers/sdm05.pdf>>, In Proceedings of the 2nd VLDB Workshop on Secure Data Management, Sep. 2005, pp. 1-17.

Sion, Radu, "Towards Secure Data Outsourcing", Retrieved at <<http://citeseerx.ist.psu.edu/viewdoc/download?doi=10.1.1.86.8594&rep=rep1&type=pdf>>, Retrieved Date: Apr. 7, 2011, pp. 23.

Yu, et al., "Achieving Secure, Scalable, and Fine-grained Data Access Control in Cloud Computing", Retrieved at <<http://www.chennaisunday.com/ieee 2010/Achieving Secure, Scalable, and Fine-grained Data Access Control in Cloud Computing.pdf>>, Proceedings of IEEE INFOCOM, Mar. 14-19, 2010, pp. 9.

"Database Encryption in Oracle9i", Retrieved at <<http://www.cgisecurity.com/database/oracle/pdf/f5crypt.pdf>>, Feb. 2001, pp. 11.

Farmer, Donald, "Deliver Rich Analytics with Analysis Services SQL Server", Retrieved at <<http://download.microsoft.com/download/3/2/F/32F05B83-DEE7-4076-A703-CD671A4DF0A9/AnalysisServices.ppt>>, Retrieved Date: Apr. 5, 2011, pp. 5.

"Windows Azure Marketplace DataMarket", Retrieved at <<http://www.microsoft.com/windowsazure/Whitepapers/DataMarket/default.aspx>>, Oct. 2010, pp. 9.

"Data Cleansing & Enrichment", Retrieved at <<http://www.sas.com/software/data-management/entdiserver/data-quality.html>>, Retrieved Date: Apr. 7, 2011, p. 1.

Comerio, et al., "Service-oriented Data Quality Engineering and Data Publishing in the Cloud", Retrieved at <<http://www.infosys.tuwien.ac.at/staff/truong/publications/2010/truong-soca10-short.pdf>>, IEEE International Conference on Service-Oriented Computing and Applications (SOCA), Dec. 13-15, 2010, pp. 6.

Mahmoudi, et al., "SDET: A Semantic Data Enrichment Tool Application to Geographical Databases", Retrieved at <<http://www2.u-bourgogne.fr/SITIS/06/Proceedings/IMRT/f27.pdf>>, 2006, pp. 88-97.

"Oracle Product Data Quality", Retrieved at <<http://www.oracle.com/partners/en/most-popular-resources/059010.html>>, Retrieved Date: Apr. 7, 2011, pp. 6.

Rotard, et al., "Semantic Lenses: Seamless Augmentation of Web Pages with Context Information from Implicit Queries", Retrieved at <<http://www.vis.uni-stuttgart.de/~giereth/publications/CG06-rotard.pdf>>, In Proceedings of Computers & Graphics, vol. 31, Issue 03, Dec. 22, 2006, pp. 1-11.

"International Search Report", Mail Date: Jan. 17, 2013, Application No. PCT/US2012/040951, Filed date: Jun. 5, 2012, pp. 10.

* cited by examiner

DATA CUSTODIAN AND CURATION SYSTEM

CROSS REFERENCE TO RELATED APPLICATIONS

This application is related to U.S. patent application Ser. No. 13/159,654 entitled "RECOMMENDING DATA ENRICHMENTS," U.S. patent application Ser. No. 13/159,666 entitled "ENRICHING DATABASE QUERY RESPONSES USING DATA FROM EXTERNAL DATA SOURCES".

BACKGROUND

Data are a valuable commodity, but access to valuable data may be difficult to manage. When data are sold to a consumer, the data may be used by the consumer over and over, or even combined with other data and resold without the control or knowledge of a data owner. This may be because the data comes into the possession of the consumer and may not be traceable or controllable after possession is transferred.

In such cases, the data owner may only be able to sell or monetize the data in a single transaction, but not be able to monetize the data for other use scenarios.

SUMMARY

A data custodian and curation system may store data from a data supplier in encrypted form and may allow users to consume the data when the consumers obtain access to the data through an agreement. The curation system may manage access to the data, even allowing a consumer to use the data as if it were their own, but may track each usage of the data to implement a payment scheme or various usage restrictions. The curation system may encrypt downstream uses of the data and operate as a digital rights management system for the data. The custodian and curation system may operate as a cloud service that may contain encrypted data from many data providers but where the data providers may individually control access to their data in a managed system at any granular level.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A data management system may permit users to purchase and use data while keeping the data within a controlled system. The data may be encrypted and managed so that each access to the data may be monitored and controlled. In many embodiments, the source data may be maintained and tracked within the data repository so that access by other parties may be monitored and controlled.

The data management system may be considered an ecosystem in which data may be shared and consumed while maintaining the data in a secured manner. Each portion of data may be combined with other data sets to deliver data intensive applications. Each data source may be maintained in its original location and state, and each access to the data source may be tracked for billing and access control.

The data management system may have a relational database management system that various applications may use. Within the relational database management system, application databases may be created that access tables, columns, rows, elements, or other database components that may be owned by data owners. Each of the database components may be separately encrypted and a curation system may provide keys to decrypt the data when requested.

The ecosystem may enable data to be shared at different granularities and for different conditions, each of which may be managed by an entitlement or agreement to allow access. For example, an entitlement may permit access to a specific table of data on a per-access price. Another entitlement may permit access to a column of data for a predetermined period of time, regardless of the number of accesses.

Data provenance may be provided to a consumer when an application uses data provided from a data owner. The encryption keys used to lock the source data may be provided to the consumer as evidence that the source data did indeed come from the source. Such provenance may be maintained even when multiple parties process the data within the ecosystem.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
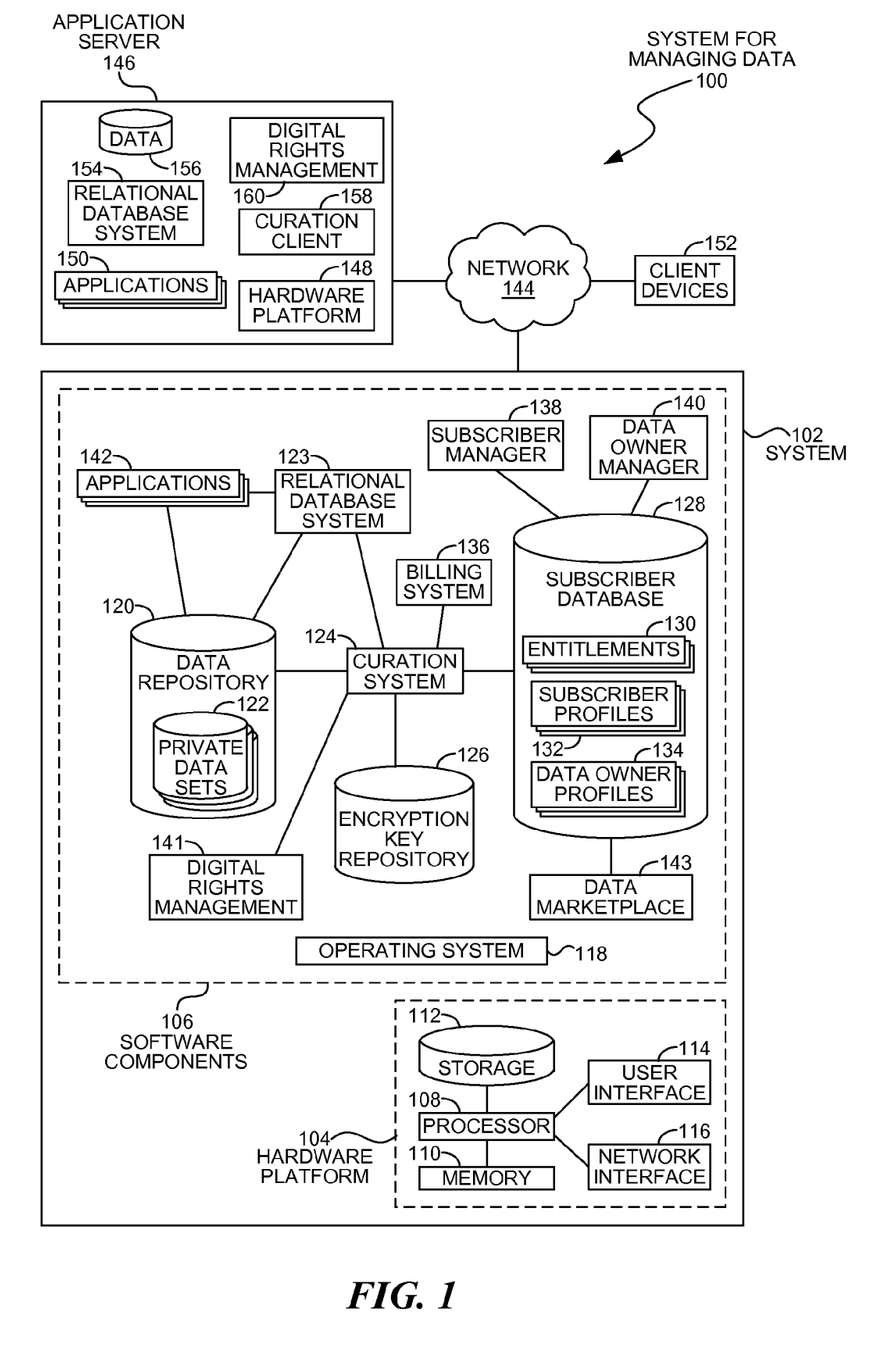
FIG. 1 is a diagram of an embodiment showing a network environment with a data management system.

FIG. 1 is a diagram of an embodiment 100, showing a system 102 that may provide a data ecosystem in which data may be shared while maintaining control of the data by the data owner. Embodiment 100 is a simplified example of a data ecosystem that manages data.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates one version of a system for managing data. Data may be sold by-the-use, while maintaining control and provenance of the data. An encryption system may encrypt each salable unit of data and access to the data may be monitored and controlled by each request for a key to decrypt the data.

Various data owners may make their data available to other users through an entitlement, which may entitle a user to access the data according to various predefined rules. The entitlement may be considered an access contract that defines the metes and bounds of the data the user may access.

The data may be maintained in a single location. A relational database system may permit users to create applications that include controlled data in their databases, but where each access to the controlled data may be monitored and logged.

Throughout this specification and claims, the term "private data" may be any data owned by a data owner for which access may be restricted and managed. In many embodiments, a data owner may make their data available for purchase or for access under restricted conditions.

In many embodiments, a data user may be a business that executes an application that consumes data. The application may have a database against which queries may be executed, and the database may contain one or more tables, rows, columns, or cells of data that are private data. When the application developer creates their database, the application developer may create links within the application database to private data.

The private data may be separately encrypted for each unit of data that may be made available. In some embodiments, the unit of data may be a group of tables, a single table, a set of rows or columns in a table, specific cells within a table, or some other unit of data in the database.

When an element of the private data is accessed, the relational database management system may determine that the data are encrypted, and may request an encryption key. An encryption key repository may contain a key that may be used to decrypt the private data and make the data available.

A curation system may manage the access to private data. The curation system may identify an access, ensure that the access is permitted by an existing entitlement, then may retrieve a key for decrypting the data. In cases where the access is billed on a per-access basis, the curation system may use a billing system to create a billable event.

The data encryption may be performed in a format preserving manner in some cases. Format preserving data encryption may result in an encrypted version of a data element where the encrypted version may have the same data type as the original version.

In some embodiments, some data elements may be encrypted in a non-format preserving manner. Such embodiments may be useful when the data have data types that are not amenable to format preserving encryption or where the data are to be protected using higher levels of security.

In many embodiments, the system may be able to track derived data which may contain or be derived from private data. When derived data are present, the derived data may be encrypted and managed in the same manner as the original private data. Such embodiments may preserve the private data even though the private data may be merged or transformed with other data.

As data are used by one or more applications, the provenance of the data may be verified with the data management system. When each of the transformations of data are preserved using the data management system, a consumer may request a verified provenance of the data. The consumer may receive a public encryption key from the data owner that may be used to verify that the data are indeed from the data owner. The public encryption key may be used to decrypt some or all of the private data, or a token or other identifier associated with the private data. In some instances, such a token may be known as an authentication token.

Data provenance may be useful in applications where high value data are used. An application that uses data from a trusted and costly source may wish to advertise that their data came from a trusted source, and may be able to verify the source to the consumer.

Many embodiments may include analytics that may be used by a data owner. The analytics may include who used the data, which data elements were accessed, how and when the data were used, and other information. The analytics data may be useful for monitoring, marketing, and monetizing the data to notice trends, highly used data, or other information.

The system of embodiment 100 is illustrated as being contained in a single system 102. The system 102 may have a hardware platform 104 and software components 106.

The system 102 may represent a server or other powerful, dedicated computer system that may support multiple user sessions. In some embodiments, however, the system 102 may be any type of computing device, such as a personal computer, game console. cellular telephone, netbook computer, or other computing device.

The hardware platform 104 may include a processor 108, random access memory 110, and nonvolatile storage 112. The processor 108 may be a single microprocessor, multi-core processor, or a group of processors. The random access memory 110 may store executable code as well as data that may be immediately accessible to the processor 108, while the nonvolatile storage 112 may store executable code and data in a persistent state.

The hardware platform 104 may include user interface devices 114. The user interface devices 114 may include keyboards, monitors, pointing devices, and other user interface components.

The hardware platform 104 may also include a network interface 116. The network interface 116 may include hardwired and wireless interfaces through which the system 102 may communicate with other devices.

Many embodiments may implement the various software components using a hardware platform that is a cloud fabric. A cloud hardware fabric may execute software on multiple devices using various virtualization techniques. The cloud fabric may include hardware and software components that may operate multiple instances of an application or process in parallel. Such embodiments may have scalable throughput by implementing multiple parallel processes.

The software components 106 may include an operating system 118 on which various applications may execute. In some cloud based embodiments, the notion of an operating system 118 may or may not be exposed to an application.

A data repository 120 may contain many private data sets 122. The private data sets 122 may include a separate data set for each unit of data that may be separately tracked and managed. Each private data set may be encrypted with a different encryption key, and the encryption keys may be stored and managed in an encryption key repository 126.

A curation system 124 may manage the private data sets 122 and provide encryption keys from the encryption key repository 126 to decrypt the various private data sets 122, among other functions. The curation system 124 may operate with a relational database system 123, where the relational database system 123 may identify an encrypted private data set 122 and request access to the curation system 124.

The relational database management system 123 may be accessed by various applications 142 that may use and manipulate one or more of the various private data sets 122.

The curation system 124 may access a subscriber database 128 to determine if any entitlements 130 exist from which access may be granted, then retrieve an encryption key. The curation system 124 may also interact with a billing system 136 to track access to a private data set 122 when an entitlement is in place that causes a billing event to occur with an access.

In some embodiments, the curation system 124 may operate with twice encrypted keys. In one such embodiment, a data user or data owner may encrypt an encryption key for a private data set with a second encryption key. In such embodiments, the curation system 124 may provide an encryption key that may be encrypted with a second encryption key known by the data owner or data user. The data owner or data user may then decrypt the encryption key to gain access to the key used to decrypt the data.

Such embodiments may be useful in protecting access to the private data sets 122 from the operator of the system 102. The double encryption may use a private key known by a data owner or data user to ensure that the operator of the system 102 does not have full access to all the encryption keys in the encryption key repository 126.

The subscriber database 128 may include subscriber profiles 132 and data owner profiles 134. The subscriber profiles 132 may include login information, billing information, and other data that may be used to create an entitlement 130. Similarly, the data owners may have data owner profiles 134 that may be used to manage the data being made available.

A subscriber manager 138 may be an interface through which a subscriber may establish and maintain a subscriber profile 132. The subscriber manager 138 may also assist a data user in finding data that may be available for purchase and use. Some embodiments may have a data marketplace 143 which may be a web based or other shopping mechanism whereby a data user may identify the data to be consumed, then the data marketplace 143 may establish an entitlement 130 that gives access to the data user.

The data owner manager 140 may be an interface through which a data owner may identify data to share, configure the various private data sets 122, and establish terms and conditions for various entitlements. The data marketplace 143 may present the private data sets to prospective data users, as well as the terms and conditions for entitlements.

In some embodiments, a digital rights management system 141 may permit or deny access to certain private data sets. In some cases, the private data sets 122 may be copied to a second location and used with another relational database management system. In such cases, the digital rights management system 141 may apply protection to the data, and a corresponding digital rights management system may permit or deny access to those data according to the applicable entitlements.

The system 102 may be connected to a network 144 to which various client devices 152 and other application servers 146 may be attached. A client device 152 may be any type of device that may access one of the applications that may use the private data sets 122. In some cases, the client devices 152 may also be used by a data owner or data user to access the data owner manager 140 or subscription manager 138, respectively.

The client devices 152 may be any network connected device. In some cases, the client devices 152 may be personal computers, server computers, mobile telephones, game consoles, laptop computers, tablet computers, or any other network enabled device.

Some embodiments may use an application server 146 to operate in conjunction with the system 102. The application server 146 may have a hardware platform 148, which may be similar to the hardware platform 104 or may be a cloud based fabric.

The application server 146 may have applications 150 that may access the relational database system 123 of the system 102 or may access a local relational database system 154.

In some embodiments, the application server 146 may request private data sets 122 from the system 102 and may have the requested private data sets 122 transmitted to be stored in local data 156. In such embodiments, the private data sets may remain encrypted during transmission and storage. In order to access the private data sets stored in the local data 156, a curation client 158 may operate in conjunction with the curation system 124 to retrieve an encryption key to decrypt the local data 156 for use. In other embodiments, the private data sets may be transmitted using digital rights management. In such embodiments, a digital rights management system 160 may permit or deny access to the private data sets.

Figure 2:
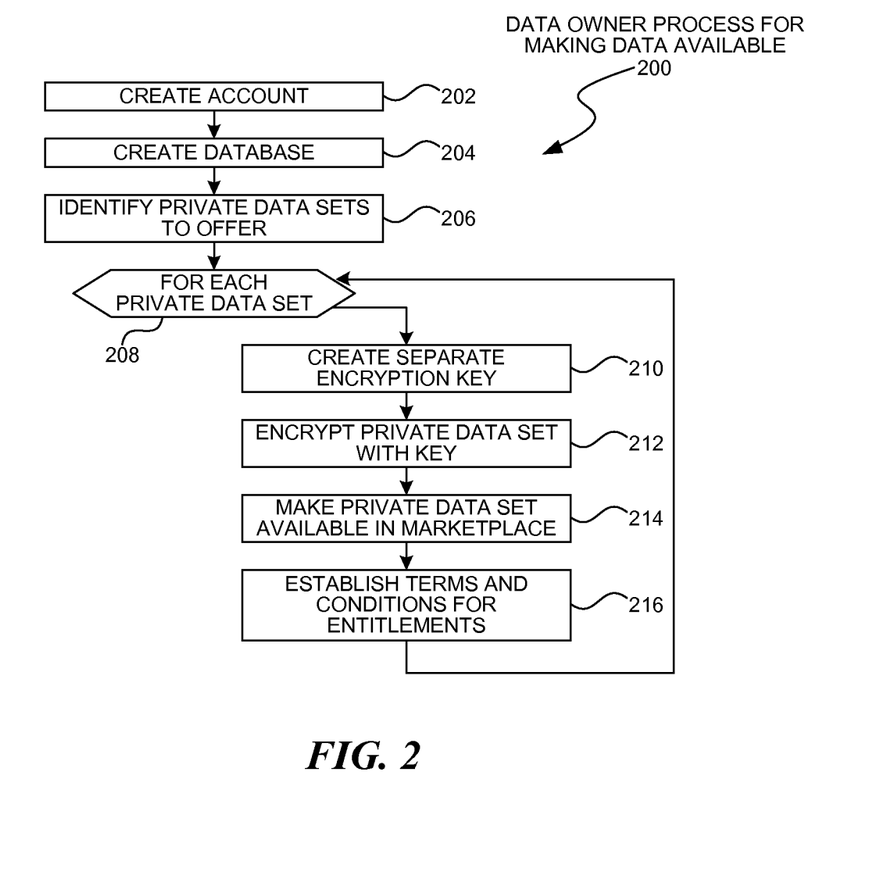
FIG. 2 is a flowchart of an embodiment showing a method for making data available by a data owner.

FIG. 2 is a flowchart illustration of an embodiment 200 showing a method for making data available. Embodiment 200 is a simplified example of a method that may be performed by a data owner to identify and prepare private data for use.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is a simplified example of the steps performed when a data owner may make private data available within a data management system. The operations of embodiment 200 may be performed using a data owner manager interface, such as the data owner manager 140 of embodiment 100.

In block 202, an account may be created. The account may include various data about the data owner, including any access authorization that the data owner may have for the data that may be shared.

In block 204, the data owner may create their database. In some embodiments, the database may be preexisting and the data owner may copy the database into a data management system for dissemination.

The data owner may identify private data sets in block 206. The private data sets may be any unit of data that the data owner may wish to make available through a data management system. In some cases, the private data sets may be one or more tables, columns, rows, individual elements, or some other unit of a database.

For each private data set in block 208, a separate encryption key may be created in block 210 and used to encrypt the private data set in block 212.

After the private data set is encrypted, the private data set may be made available in a marketplace in block 214. The terms and conditions of any entitlements may be defined in block 216 and also included in the marketplace. The process may return to block 208 to process any additional private data sets.

Figure 3:
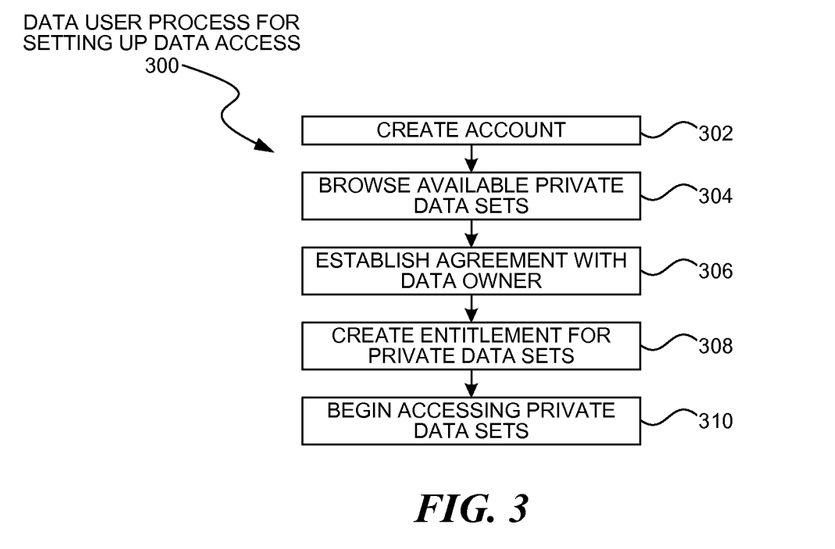
FIG. 3 is a flowchart of an embodiment showing a method for setting up data access.

FIG. 3 is a flowchart illustration of an embodiment 300 showing a method for setting up access to a private data set. Embodiment 300 is a simplified example of a method that may be performed by a data user to identify and prepare private data for use.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is a simplified example of the steps performed when a data user may begin using private data. The operations of embodiment 300 may be performed using a subscription interface, such as the subscription manager 138 of embodiment 100.

A data user may establish an account in block 302. The account may include payment information that may be debited to meet the terms and conditions of any entitlement that may be established to private data sets.

The data user may browse available private data sets in block 304 and may establish an agreement in block 306 with the data owner to obtain access. An entitlement may be created in block 308 and stored with a data management system, which may begin permitting the data user to access the data in block 310.

Figure 4:
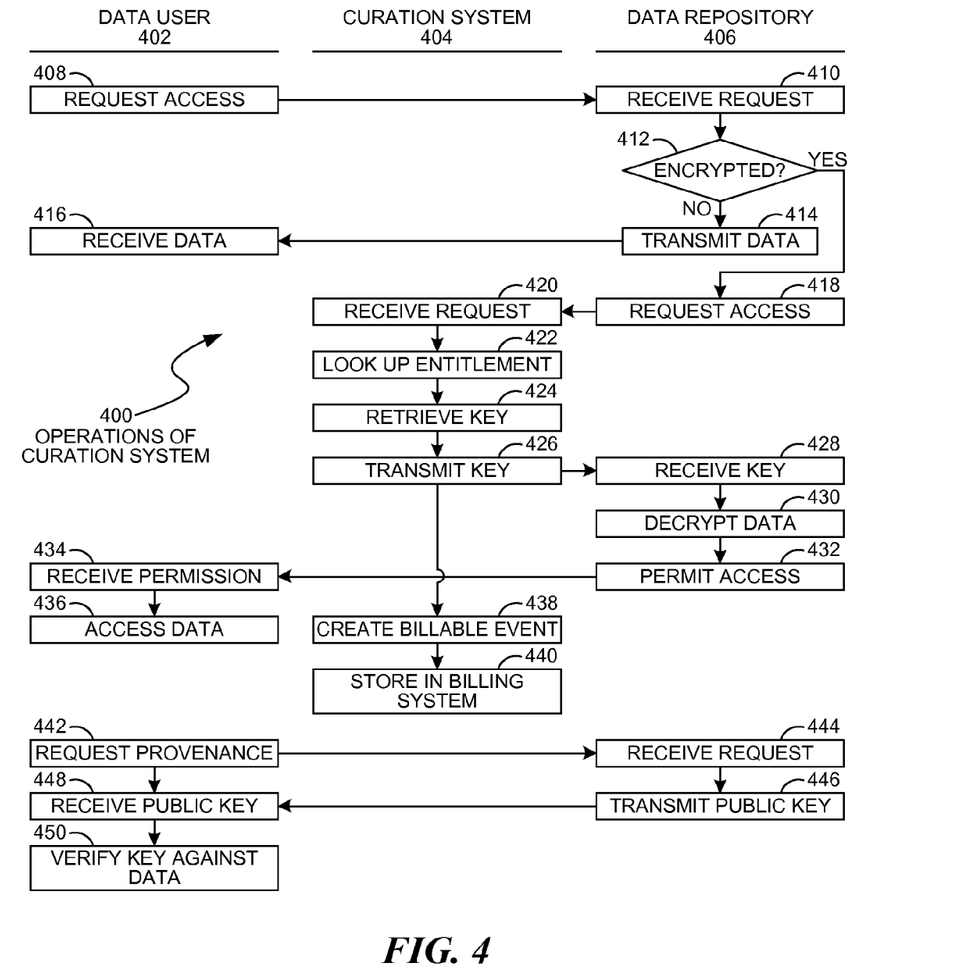
FIG. 4 is a flowchart of an embodiment showing a method for permitting access with a curation system.

FIG. 4 is a flowchart illustration of an embodiment 400 showing a method for interacting with and operating a curation system. The operations of a data user 402 may be illustrated in the left hand column. The operations of a curation system 404 may be illustrated in the center column, and the operations of a data repository 406 may be illustrated in the right hand column. The operations illustrated for a data user 402 illustrate operations performed by a device or software under the control of the data user 402.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is a simplified example of some steps that may be performed when a data user uses private data. The curation system 404 and data repository 406 may interact to decrypt private data and permit access when the conditions of an entitlement are satisfied.

Embodiment 400 further illustrates a simplified interaction that may be performed in order to provide provenance for private data.

In block 408, a data user 402 may request access to a data repository 406, which may receive the request in block 410. If the request is not for encrypted data in block 412, the data may be transmitted in block 414 and received in block 416.

The operations of blocks 412 through 416 represent a case where the data stored in the data repository is freely available to the data user. Such a situation may occur when the data being accessed are owned by the data user or when the data are publically available.

If the data are encrypted in block 412, the data repository 406 may request access in block 418, which may be received by the curation system 404 in block 420.

The curation system 404 may look up any entitlement to determine whether or not the data user 402 may be granted access in block 422. If the data user 402 is granted access, the curation system 404 may retrieve an encryption key in block 424 and transmit the key in block 426 to the data repository 406. The data repository 406 may receive the key in block 428, decrypt the data in block 430, and permit access in block 432. The data user 402 may receive permission in block 434 and access the data in block 436.

In other embodiments, the decryption may be performed by the data user 402. In such an embodiment, the encryption key may be transmitted to the data user 402 and used by the data user 402 to decrypt the data. In some embodiments, the encryption key may be stored by the curation system 404 as an encrypted object, with the data user 402 having a second encryption key that can be used to decrypt the key held by the curation system 404.

After the curation system handles the encryption key look up in blocks 422 and 424, the curation system 404 may create a billable event in block 438 and store the billable event in a billing system in block 440.

In many embodiments, an entitlement may be created that charges a fee based on an access event. Some embodiments may, for example, charge a fee for each use. Other embodiments may charge a fixed fee for a certain number of accesses. Still other embodiments may permit unlimited accesses for a certain period of time after the first access. Various entitlements may be structured with different conditions.

In block 442, the data user 402 may request provenance for certain data. The request may be received by the data repository 406 in block 444. In response, the data repository 406 may transmit a public key in block 446 to the data user 402, which may receive the public key in block 448 and use the public key to verify against the encryption of the data in block 450.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
   a data repository comprising a plurality of private data sets, each of said private data sets being available for purchase in a data marketplace, a private data set, from said plurality of private data sets, comprising a set of data groups, including a first data group, each of said data groups being encrypted using a separate encryption key, including data in the first data group being encrypted with an encryption key for the first data group, said data repository storing said first data group in a first table, said first table including a first portion of data, said data repository storing a derived portion of data in a second table, said derived portion of data derived from said first portion of data by combining said first portion of data with a second portion of data, said second portion of data accessed from a location outside the first data group, said first portion of data encrypted using said encryption key, said derived portion of data also encrypted using said encryption key to prevent unauthorized access to said derived portion of data due to said derived portion of data being derived from said first portion of data; and
   a data curation system for controlling access to private data sets available for purchase in said data marketplace, said data curation system comprising a subscriber database, said subscriber database comprising a subscriber profile for a subscriber and a data owner profile for an owner of said first data group, said subscriber database further comprising a entitlement granting said subscriber access to said encryption key, said encryption key allowing said subscriber to decrypt said first data group and for use in decrypting said derived portion of data.

2. The system of claim 1, said data curation system managing access to said first data group according to said first entitlement.

3. The system of claim 2, said first entitlement defining a limited number of accesses to said first data group, said data curation system limiting access to said first data group to said limited number.

4. The system of claim 1, said first table also comprising subscriber data for said subscriber.

5. The system of claim 4, said first data group encrypted using format preserving encryption such that an unencrypted format of said first data group and an encrypted format of said first data group are the same format.

6. The system of claim 5, wherein said subscriber data is in said unencrypted form.

7. The system of claim 1, said second table having a data provenance.

8. The system of claim 1 further comprising:
   a billing system that identifies an access to said first data group through said data marketplace using said first entitlement and generates a billing event based on said access.

9. The system of claim 8, said billing event being generated when said encryption key is requested.

10. A method comprising:
    presenting a plurality of data sets available for purchase in a data marketplace, each of said data sets being owned by a data owner and stored in a data store, said data marketplace presenting conditions for becoming entitled to use each of said data sets, a first data set including a first data group stored in a first table and a portion of derived data stored in a second table, said first data group including a first portion of data, said derived portion of data derived from said first portion of data by combing said first portion of data with a second portion of data, said second portion of data from a location outside of said first data set, a portion of said first table containing said first portion of data encrypted using an encryption key for said first data set and a portion of said second table containing said derived data set also encrypted using said encryption key for said first data set to prevent unauthorized access to said derived portion of data due to said derived portion of data being derived from said first portion of data;
    establishing a first entitlement between a data user and said data owner, said first entitlement allowing said data user to access said first data set, said first entitlement based on said data user satisfying said presented conditions for becoming entitled to use said first data set;
    receiving a request for one of: said first portion of data and said derived portion of data from said data user, said request comprising a reference to said first entitlement;
    evaluating said first entitlement to determine that said data user has access to said one of: said first portion of data and said derived portion of data; and
    decrypting said first data set using said encryption key.

11. The method of claim 10 further comprising:
    returning said encryption key to said data user to decrypt said first data set.

12. The method of claim 10 further comprising:
    detecting that said data user requested said first data set and logging said request in a billing system.

13. The method of claim 10 further comprising:
    requesting a provenance from a consumer for said first data set, said consumer being a user of said first data set as provided by said data user; and
    returning an authentication token for said first data set.

14. The method of claim 13, said authentication token being a public key for said first data set.

15. The method of claim 14, said consumer having a second entitlement between said consumer and said data user, said second entitlement allowing said consumer to access a second different subset of said plurality of data sets.

16. The method of claim 15, said second different subset being stored in said data store.

17. A system comprising:
a data repository comprising a plurality of private data sets, each of said private data sets being available for purchase in a data marketplace, a private data set from among said plurality of private data sets comprising a set of data groups, including a first data group, said data repository storing said first data group in a first table, said first data group including a first portion of data, said data repository storing a derived portion of data in a second table, said derived portion of data derived from said first portion of data by combining said first portion of data with a second portion of data, said second portion of data accessed outside of the private data set, a portion of said first table containing said first portion of data encrypted using an encryption key for said private data set, a portion of said second table containing said derived data also encrypted using said encryption key to prevent unauthorized access to said derived portion of data due to said derived portion of data being derived from said first portion of data;
each of said private data sets being owned by a separate data owner;
an encryption key repository comprising separate encryption keys for each private data set including said encryption key for said one of said private data sets;
a data curation system for controlling access to data available for purchase in said data marketplace, said data curation system comprising:
a subscriber database comprising entitlements, said entitlements granting subscribers access to private data sets owned by data owners;
said data curation system that:
grants entitlements to subscribers for accessing private data sets based on subscribers satisfying conditions for becoming entitled to access said private data sets;
receives a first request from a first subscriber comprising a first entitlement and a request for one of: said first portion of data or said derived portion of data;
validates said first entitlement; and
returns said encryption key for said first private data set to said first data subscriber.

18. The system of claim 17 further comprising:
a billing system that detects said first request as a billable event.

19. At a computer system, the computer system including system memory and a processor, a method comprising:
the processor accessing a first data set, the first data set associated with a first access condition for controlling access to the first data set; and
the processor generating a derived data set including another version of the first data set or a derivative version of the first data set by combining the first data set with a second separate data set, wherein the second separate data set is maintained separately from and outside of the first data set and is associated with a second access condition for controlling access to the second separate data set, the derived data set associated with both the first access condition and the second access condition; and
wherein unauthorized access to the derived data set is prevented by requiring both the first access condition and the second access condition to be met prior to entitling use of the derived data set.

20. The method of claim 19, further comprising encrypting both the first data set and the derived data set using an encryption key such that the derived data set can be managed in the same manner as the first data set.

21. The method of claim 20, further comprising granting access to the first data set or the second separate data set by returning the encryption key to decrypt the first data set or the derived data set.

22. The method of claim 21, further comprising creating a billable event associated with permitting access to the first data set or the derived data set.

23. The method of claim 19, further comprising establishing an entitlement for accessing the derived data set, the entitlement established between a data owner of the first data set and a data user.

24. A computer program product for use at a computer system, said computer program product for implementing a method, said computer program product comprising one or more computer storage devices having stored thereon computer-executable instructions that, when executed at a processor, cause said computer system to perform the method, including the following:
access a first data set, the first data set associated with a first access condition for controlling access to the first data set; and
generating a derived data set including another version of the first data set or a derivative version of the first data set by combining the first data set with a second separate data set, wherein the second separate data set is maintained separately from and outside of the first data set and is associated with a second access condition for controlling access to the second separate data set, the derived data set associated with both the first access condition and the second access condition; and
wherein unauthorized access to the derived data set is prevented by requiring both the first access condition and the second access condition to be met prior to entitling use of the derived data set.

25. The computer-program product of claim 24, further comprising computer-executable instructions that, when executed, cause said computer system to encrypt both the first data set and the derived data set using an encryption key such that the derived data set can be managed in the same manner as the first data set.

26. The computer-program product of claim 25, further comprising computer-executable instructions that, when executed, cause said computer system to grant access to the first data set or the derived data set by returning the encryption key to decrypt the first data set or the derived data set.

27. The computer program product of claim 24, further comprising computer-executable instructions that, when executed, cause said computer system to establish an entitlement for accessing the derived data set, the entitlement established between a data owner of the first data set and a data user.

28. A system, the system comprising:
one or more processors;
system memory; and
one or more computer storage devices having stored thereon computer-executable instructions representing a curation system, the curation system configured to:
access a first data set, the first data set associated with a first access condition for controlling access to the first data set; and
generate a derived data set including another version of the first data set or a derivative version of the first data set by combining the first data set with a second separate data set, wherein the second separate data set is maintained separately from and outside of the first data set and is associated with a second access condition for controlling access to the second separate data set, the derived data set associated with both the first access condition and the second access condition; and wherein unauthorized access to the derived data set is prevented by requiring both the first access condition and the second access condition to be met prior to entitling use of the derived data set.

29. The system of claim 28, wherein the curation system is further configured to grant a data user access to the first data set or the derived data set.

30. The system of claim 28, wherein the curation system is further configured to establish an entitlement for accessing the derived data set, the entitlement established between a data owner of the first data set and a data user.

* * * * *